United States Patent

[11] 3,618,011

| [72] | Inventor | Harry A. Leeder, Jr.<br>Skaneateles, N.Y. |
|---|---|---|
| [21] | Appl. No. | 793,933 |
| [22] | Filed | Jan. 27, 1969 |
| [45] | Patented | Nov. 2, 1971 |
| [73] | Assignee | R. E. Dietz Company<br>Syracuse, N.Y. |

[54] COMPENSATED PILOT INDICATOR CIRCUIT FOR VEHICLE TURN SIGNAL SYSTEMS
5 Claims, 6 Drawing Figs.

[52] U.S. Cl.................................................. 340/80,
340/81, 340/251
[51] Int. Cl.......................................................... B60q 1/38
[50] Field of Search.......................................... 307/132;
315/129, 130, 133, 136; 317/155.5; 340/55, 67,
80, 81, 82, 83, 251, 331, 252, 253

[56] References Cited
UNITED STATES PATENTS

| 2,368,084 | 1/1945 | Alexander | 340/253 X |
| 3,099,756 | 7/1963 | Penfold et al. | 307/132 MR |
| 3,171,096 | 2/1965 | Murray et al. | 340/69 |
| 3,247,402 | 4/1966 | Hayden | 340/331 X |
| 3,408,625 | 10/1968 | Skinner | 340/79 |
| 3,413,519 | 11/1968 | Leeder | 340/331 X |
| 3,421,143 | 1/1969 | Signorile | 340/253 X |
| 3,504,338 | 3/1970 | Breece | 340/82 X |
| 3,508,237 | 4/1970 | Kimmelman | 340/251 |

FOREIGN PATENTS

| 1,235,325 | 5/1960 | France | 340/81 |
| 737,480 | 9/1955 | Great Britain | 340/251 |

Primary Examiner—John W. Caldwell
Assistant Examiner—Kenneth N. Leimer
Attorney—Bruns & Jenney ABSTRACT: A pilot lamp circuit that indicates to a vehicle operator the direction of the turn he has signaled and also that all of the vehicle turn signal lamps are operable. The circuit includes a pilot relay having a winding in series with the signal lamps and adjusted so that it will not be actuated if one or more of the signal lamps has failed. Normal voltage variations are compensated for by an additional relay winding that is wound so that its current, which is proportional to the source voltage, produces a flux opposed to the main flux.

PATENTED NOV 2 1971 3,618,011

INVENTOR.
HARRY A. LEEDER JR.

BY Bruns and Jenney
Attorneys

COMPENSATED PILOT INDICATOR CIRCUIT FOR VEHICLE TURN SIGNAL SYSTEMS

BACKGROUND OF THE INVENTION

This invention relates generally to vehicle turn signal systems and has particular reference to a novel pilot indicator circuit for use with flasher circuits, the indicator circuit being provided with means for compensating for source voltage variations to enable faithful performance in the indication of load outage.

Most vehicle turn signal systems are provided with pilot indicator means which tell the operator the direction of the turn he has signaled and also if one or more of the turn signal lamps has failed. This can be accomplished by a relay the winding of which is in series with the current drawn by the lamps, the relay being adjusted so that it will be actuated when all of the required lamps are operable and not actuated if one or more of the lamps are out. The relay contacts when connected with suitable auxiliary wiring and pilot indicator lamps provide the desired indicator means.

In order to perform properly, the indicator relay must operate in the required manner over the relatively wide voltage range that exists in automotive electrical systems. Thus, in a 12 volt system, the range may be from 11 to 15 volts. With the increased number of turn signal lamps that are employed in present day systems, variations in the source voltage create a problem affecting the reliability of the pilot indicator means. For example, if the turn signal is supposed to flash four lamps on one side, the current drawn by three of these lamps at 15 volts may be equal to the current drawn by all four lamps at 11 volts so that the indicator relay cannot distinguish between four-lamp and three-lamp operation.

SUMMARY OF THE INVENTION

The pilot indicator circuit of the invention is provided with means to compensate for normal variations in the source voltage so that there will be faithful performance in indicating the failure of a lamp even though a relatively large number of lamps are being simultaneously energized. The compensating means is a circuit comprising an additional indicator relay winding, a capacitor and a resistor connected in series across the contacts of a load current switching relay in the flasher circuit that is employed in the turn signal system. The additional winding is wound so that its current, which is proportional to the source voltage, produces a flux that is opposed to that of the main relay winding. This results in there being a readily distinguishable current differential between total lamp operation and less than total operation over the entire voltage range.

In accord with the invention, a hazard warning circuit may be provided for use in conjunction with the pilot indicator circuit. Thus, in the hazard warning or emergency mode, when the hazard warning switch is closed it is desirable to have all available load lamps flash. This is accomplished by having the hazard warning circuit include a winding on the pilot indicator relay which is wound so that the flux produced by the load current in the winding is in the same direction as the flux produced by the current in the compensating winding. With the two fluxes aiding, the circuit will continue to flash as long as at least one load lamp is operable.

DESCRIPTION OF THE PREFERRED EMBODIMENTS

Figure 1:
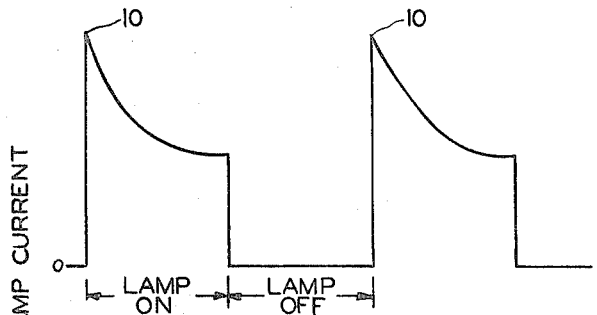
FIG. 1 is a current-time diagram for a load lamp.
Figure 2:
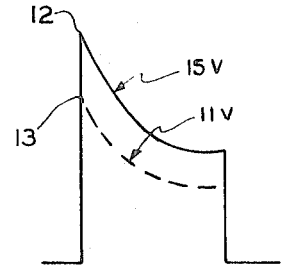
FIG. 2 is a diagram corresponding to FIG. 1 showing the effect of voltage variation.

As noted hereinabove, prior pilot indicator arrangements have utilized a relay having a winding in series with the current drawn by turn signal lamps, the relay being adjusted so that it will actuate when all of the lamps are drawing current and not actuate if one or more lamps are not drawing current. FIG. 1 shows the instantaneous current in a tungsten filament signal or load lamp as the flasher circuit cycles. A load current operated pilot indicator relay, to be presently described in more detail, will be actuated by the peak current at the beginning of each "ON" period as shown at 10 in FIG. 1. The value of this peak current is affected by the voltage and by the on/off duty cycle ratio of the flasher circuit. In FIG. 2, corresponding to a portion of FIG. 1, the effect of voltage variation is shown, the peak current being considerably higher at 15 volts than it is at 11 volts as indicated at 12 and 13, respectively.

If, in an automotive turn signal system, the turn signal switch causes three lamps to flash, the numerical values for typical lamps presently in use show that the total current for the three lamps at 11 volts is higher than it is for two lamps at 15 volts. There is, therefore, a distinguishable current difference between three-lamp operation and two-lamp operation, and an indicator relay with a single winding can be adjusted to operate in the intended manner over the entire voltage range, such adjustment causing the relay to be actuated when the current in its winding is at a value between the current values for the three-lamp 11 volt operation and the two-lamp 15 volt operation.

On the other hand, if the turn signal switch is supposed to put four lamps in operation, the current drawn by three lamps at 15 volts is just about equal to the current drawn by four lamps at 11 volts and the indicator relay is unable to differentiate between four-lamp and three-lamp operation. Going a step further, if the vehicle turn signal system is set up to flash more than four lamps, proper functioning of the indicator relay is impossible because the current drawn by all of the lamps at 11 volts is less than the current drawn at 15 volts with one lamp out.

Figure 3:
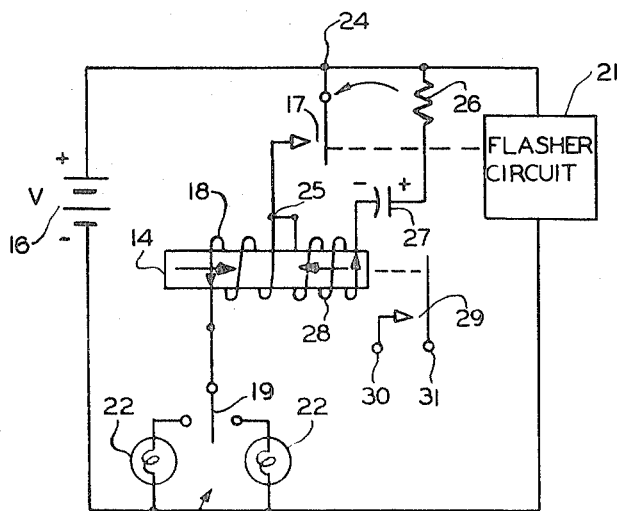
FIG. 3 is a schematic diagram of one form of the pilot indicator circuit of the invention.

In accord with the invention, the problem outlined above is solved in a novel manner by a pilot indicator circuit as shown in FIG. 3 wherein means are provided for compensating the pilot indicator relay for the effects of voltage variations. In FIG. 3, the core of the pilot indicator relay is shown at 14 and the pilot indicator circuit includes a series circuit comprising a source of current 16, a first switching means 17, the main relay winding 18, a second switching means 19 and a load indicated generally at 20. The current source 16 will normally be a 12-volt vehicle battery while the first switching means 17 is preferably the contact pair of a load relay (not shown) forming a part of the flasher circuit, the latter being connected across the source 16 and diagrammatically indicated at 21 in FIG. 3. The second switching means 19 is a double throw turn signal switch having left and right closed contact positions for left and right turn indications. The load 20 consists of a plurality of parallel connected load devices in the form of turn signal lamps 22.

The means for compensating the indicator relay for voltage variations comprises a series circuit connected across the first switching means 17 between the points 24 and 25. This latter circuit includes a resistor 26, capacitor 27 and an additional relay winding 28 that is wound on the relay core 14 so that current flowing through it will produce a flux that is opposed to the flux set up by current flowing through the main relay winding 18. The indicator relay includes a contact pair 29 having terminals 30, 31 which can be connected to pilot lamps or otherwise utilized in the circuit as will be described hereinafter.

Operation of the FIG. 3 pilot indicator circuit is as follows—starting with the turn signal switch 19 open, the flasher relay contacts 17 open and capacitor 27 discharged: When the vehicle operator closes the turn signal switch to indicate a left or right turn, capacitor 27 charges to the line voltage through resistor 26, the compensating and main relay windings 28 and 18, the closed turn signal switch and the low off resistance of the lamp 22 put in circuit by the turn signal switch. Thereafter, when the flasher circuit 21 closes its relay contacts 17, the peak inrush current to the load lamp occurs causing it to light and at the same instant capacitor 27 discharges through resistor 26, relay contacts 17 and the compensating winding 28. Compensating flux in opposition to that of the main winding is thus produced in the indicator relay.

Figure 4:
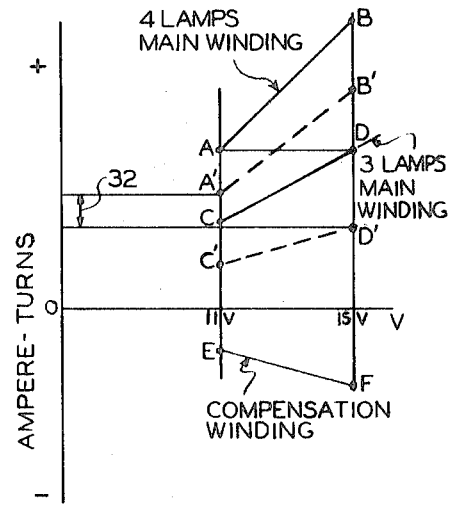
FIG. 4 is an ampere turn-on voltage diagram showing the effect of the compensating winding on the main winding of the indicator relay for a plurality of load lamps over the normal automotive voltage range.

The effect of the compensating flux is illustrated by the diagram of FIG. 4 in which the vertical and horizontal axes respectively represent ampere-turns and voltage. The diagram is with respect to a four load lamp system operating over the normal automotive voltage range of from 11 to 15 volts. In the diagram, points A and B represent the ampere-turns produced by the main relay winding 18 at 11 and 15 volts respectively with all four lamps operating, i.e., drawing current. Similarly, points C and D represent the ampere-turns produced by three lamps at 11 and 15 volts, i.e., with one of the lamps having failed. It can be seen that in this situation points A and D represent the same number of ampere-turns and this being the case, a relay with only a main winding cannot distinguish between them.

Points E and F in the FIG. 4 diagram represent the opposing ampere-turns produced by the compensating winding 28 at 11 and 15 volts respectively, and points A'–B' and C'–D' are the net ampere-turns produced by four lamps and three lamps, respectively. Since there is now a positive or distinguishable current differential between points A' and D', as indicated by the double arrow 32 or, in other words, a distinguishable current differential between four-lamp operation at the low end of the voltage range and three-lamp operation at the high end of the voltage range, the pilot relay can be adjusted so that it will actuate for four-lamp operation but not for three. The amount of compensating ampere-turns can be adjusted as required by varying the number of turns in the compensating winding 28. This can also be accomplished by varying the value of resistor 26 since the compensating current at the instant of application is V/R. Since the capacitor 27 charges to the full line voltage, the compensating current is exactly proportional to the voltage, and it occurs exactly when needed—at the instant the lamps come on.

Figure 5:
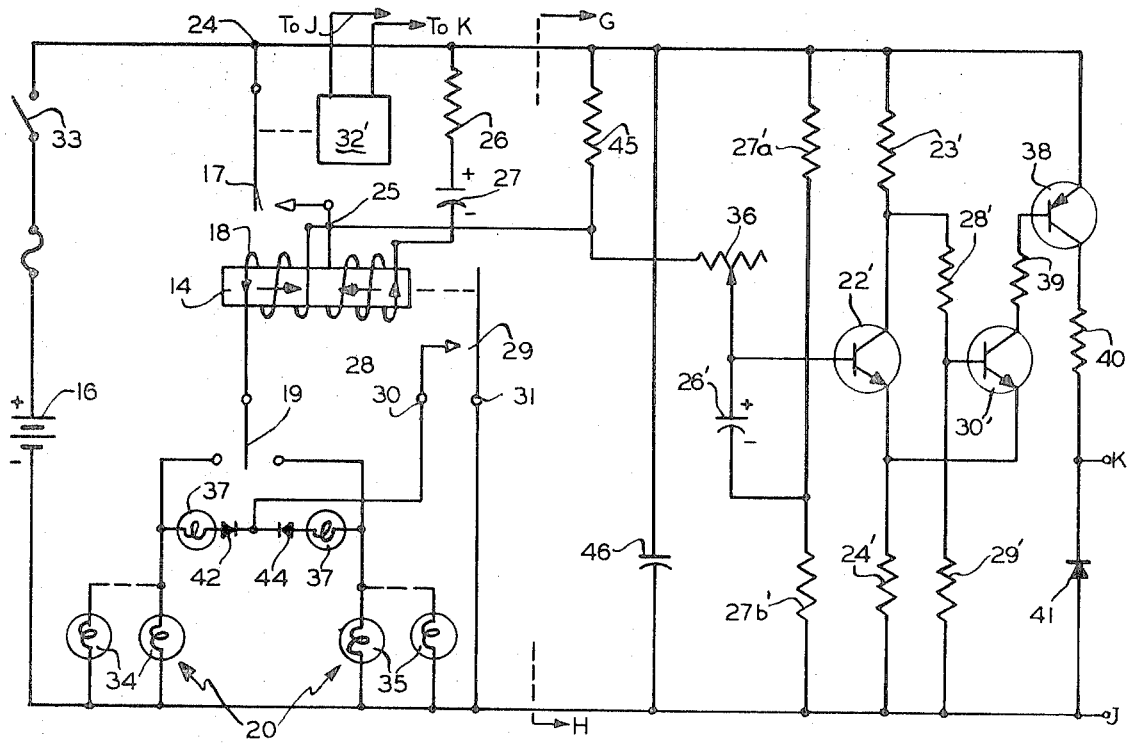
FIG. 5 is a schematic diagram of a pilot indicator circuit of the invention connected to a flasher circuit having a normally open load relay.

FIG. 5 shows the pilot indicator circuit of the invention connected to a flasher circuit in a typical vehicle turn signal system, the flasher circuit in this case having a normally open load relay in a negative ground system. The portion of the flasher circuit to the right of arrows G, H in FIG. 5 is substantially the same as that disclosed in the applicant's copending application, Ser. No. 752,121, filed July 23, 1968 (now U.S. Pat. No. 3,452,248 granted June 24, 1969) and entitled "-Heavy Duty Relay-Transistor Flasher Circuit," specific reference being made to the circuit disclosed in FIG. 7 of said application. Accordingly, most of the components in the flasher circuit of FIG. 5 of the present application have the same reference numbers they have in FIG. 7 of the copending application, and reference is made to the latter for a detailed description of the circuit.

Initially, with the ignition switch 33 closed and the turn signal switch 19 open, the circuit of FIG. 5 is in a state such that the timing capacitor 26' is charged, transistor 22' is conducting, transistors 30' and 38 are not conducting and the contacts 17 of the load relay are open. In addition, and as previously described, capacitor 27 in the compensating circuit is discharged. When the turn signal switch 19 is closed, as for example to flash a plurality of parallel connected turn signal lamps 34 on the left side of the vehicle—only two of which are shown in the schematic diagram, capacitor 27 charges through resistor 26 and at the same time the timing capacitor 26' discharges through the variable resistor 36, the main winding 18 of the indicator relay, the turn signal switch and the unlighted lamps 34.

The discharging of capacitor 26' causes the base potential of transistor 22' to move toward ground potential and when it reaches the critical value of its lower trigger level, the transistor stops conducting and the circuit changes state whereby transistors 30' and 38 become conductive. With transistor 38 conducting, its collector current flows through resistor 40 and the coil of the load relay 32' causing its contacts 17 to close. When the load relay contacts close, full battery voltage is applied across the load lamps, the peak inrush current to the lamps occurs and the lamps light. At the same instant, capacitor 27 discharges through resistor 26, the load relay contacts and the compensating winding 28 setting up the opposing compensating flux in the pilot indicator relay as previously described.

If all of the load lamps are operable, the adjusted indicator relay is actuated closing its contacts 29 and completing a circuit through the left pilot indicator lamp 37. The pilot lamp circuit is from the source 16, through load relay contacts 17, the main indicator relay winding 18, turn signal switch 19, lamp 37, diode 42, indicator relay contacts 29 and back to the source. A diode 44 acting in conjunction with the right pilot indicator lamp 37', prevents the above-described circuit from being completed through the right pilot lamp and the load lamps 35.

When the flasher circuit closes the load relay contacts 17 the previously discharged timing capacitor 26' begins to charge through the contacts and resistor 36. This causes the base potential of transistor 22' to move toward the battery potential and when it reaches its upper trigger level, the transistor starts to conduct, transistors 30' and 38 are shut off and the circuit is triggered back to its original state with load relay contacts 17 open, load lamps 34 off, compensating capacitor 27 charging and timing capacitor 26' discharging. As long as the turn signal switch 19 remains closed, the circuit will continue to operate with its alternate charging and discharging phases whereby the load lamps are flashed on and off.

In the event that one or more of the load lamps fail, the current drawn by the remaining lamps will be insufficient to actuate the pilot indicator relay, its contacts 29 will not close and the pilot indicator lamp will not light. This will indicate a lamp failure to the operator but will not prevent the circuit from continuing to flash the remaining lamps because the state of the indicator relay contacts in no way affects the operation of the flasher circuit.

Two components incorporated in the flasher circuit of FIG. 5 that are not included in the flasher circuit (FIG. 7) of copending application, Ser. No. 752,121 are a resistor 45 and a capacitor 46. Resistor 45 is connected between the positive side of the battery and the junction of resistor 36 and the load relay contacts, and is provided to hold the circuit in an off state, i.e., with load relay 32' deenergized, when the turn signal switch 19 is open. Capacitor 46 is connected directly across the battery and is provided to filter out line transients.

Figure 6:
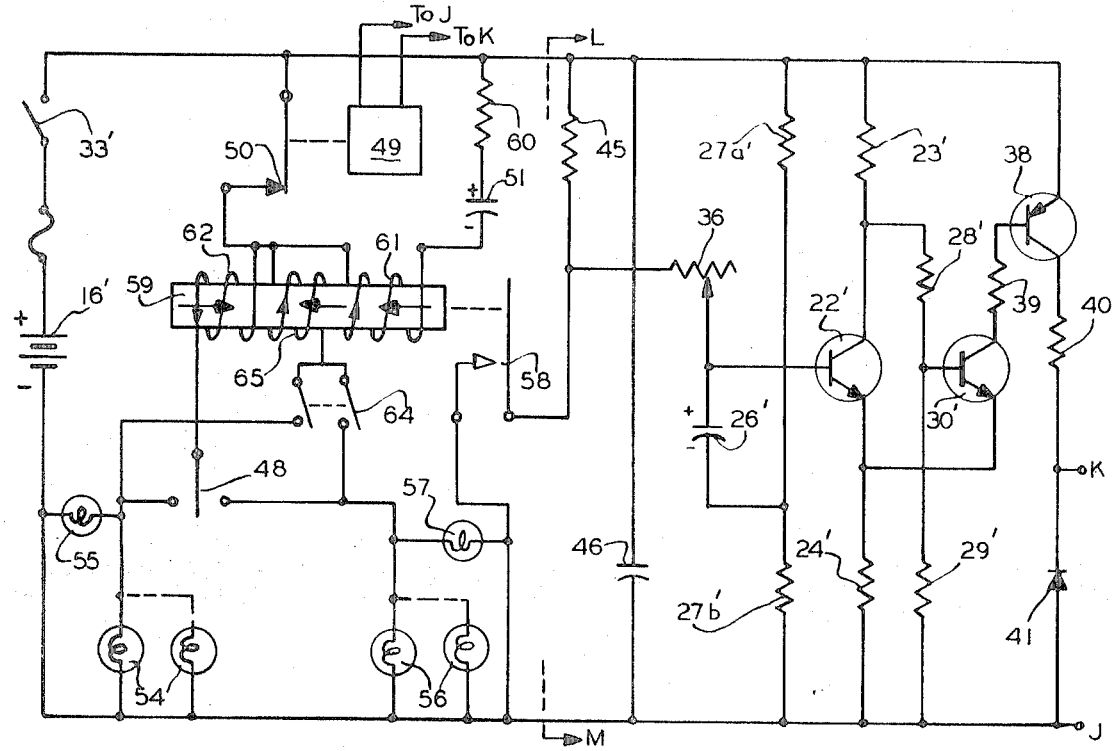
FIG. 6 is a schematic diagram of a pilot indicator circuit of the invention connected to a flasher circuit having a normally closed load relay.

FIG. 6 is a modified turn signal system wherein the pilot indicator circuit of the invention is used in conjunction with a normally closed load relay in a negative ground arrangement. In certain applications, it may be desirable, if a load lamp fails, to have the circuit stop flashing and the operable lamps remain steadily on. This can be accomplished by utilizing a load relay the contacts of which are closed when the relay is in the deenergized state. The portion of the flasher circuit to the right of arrows L, M, in FIG. 6 is identical with the circuitry to the right of arrows G, H in FIG. 5.

In the modification of FIG. 6, the operation of the first cycle differs from that of the FIG. 5 circuit. Initially, with the ignition switch 33' closed and the turn signal switch 48 open, the load relay 49 is not energized and its contacts 50 are closed; compensating capacitor 51 is discharged and the timing capacitor 26' is charged. When the turn signal switch 48 is closed to signal a turn, the load lamps light immediately and so does the corresponding pilot indicator lamp. Thus, for a left turn load lamps 54 and pilot lamp 55 light, and for a right turn load lamps 56 and pilot lamp 57 light. If all load lamps are operable, the contacts 58 of the pilot indicator relay 59 close. There is no compensating current at this time and capacitor 51 is not charging.

When the indicator relay contacts 58 close, the timing capacitor 26' starts to discharge through variable resistor 36 and the closed relay contacts. This causes the base potential of transistor 22' to move toward ground potential until it reaches its lower trigger level and the transistor shuts off. As a result, the circuit changes state and transistors 30' and 38 start conducting whereby the load relay is energized and its contacts 50 opened. With the opening of the contacts 50, the load current ceases to flow, the load and pilot lamps go off and the indicator relay contacts open.

With both pairs of relay contacts 50 and 58 open, capacitor 26' stops discharging and starts to charge again. At the same time, capacitor 51 charges to line voltage through resistor 60, the compensating and main relay windings 61 and 62, and the load lamps. The charging of capacitor 26' causes the base potential of transistor 22' to move toward the battery potential and when it reaches its upper trigger level, the transistor starts to conduct and transistors 30' and 38 are shut off. When transistor 38 stops conducting, the load relay contacts 50 close, the peak inrush current to the load lamps flows through the main winding 62 of the indicator relay and capacitor 51 discharges compensating current through the compensating winding 61. Thereafter, the cycling of the circuit is the same as described for the circuit of FIG. 5.

With the turn signal switch 48 closed, cycling will continue as long as all of the load lamps are operable because the intermittently applied load current will be sufficient to actuate the indicator relay thereby providing a discharge path for capacitor 26' through the closed relay contacts 58. If, on the other hand, one of the load lamps fails, the indicator relay will not be actuated, its contacts will remain open and capacitor 26' will remain in a charged state so that transistor 22' is conducting and transistors 30' and 38 are shut off. Under these conditions, the load relay contacts 50 remain closed and all operable lamps put in circuit by the turn signal switch remain on.

In the circuit of FIG. 6, provision is made for an emergency or hazard warning signal. For this signal, it is desirable that all operable turn signal lamps—on both sides of the vehicle—flash. To this end, a double pole emergency switch 64 is connected to a third winding 65 on the indicator relay 59, the other side of the winding being connected to the junction of the load relay contacts and compensating circuit as shown. When the switch 64 is closed, the lamps on both sides of the vehicle are simultaneously placed in circuit. The winding 65 for the emergency circuit is wound on the relay so that the flux produced by the load lamp current in the winding is in the same direction as the flux produced by current in the compensating winding 61. With the two fluxes aiding, the circuit will continue to flash as long as the emergency switch 64 remains closed and at least one load lamp 54, 56 is operable.

It should be noted that for the best operation of the pilot indicator circuits disclosed herein, the flash rate of the flasher circuit should be as constant as possible over the voltage range. If the flash rate varies to any degree, the peak inrush current to the lamps will vary and the compensating means may be adversely affected. The flasher circuits disclosed in the previously cited copending application, Ser. No. 752,121 have proved to be very stable and work well with the indicator circuits of the present invention.

From the foregoing description it will be apparent that the invention provides a novel and very desirable pilot indicator circuit that is capable of sensing the failure of one of a plurality of load devices and doing so with high fidelity in spite of variations in the applied voltage. As will be understood by those familiar with the art, the invention may be embodied in other specific forms without departing from the spirit or essential characteristics thereof. The embodiments disclosed are, therefore, to be considered in all respects as illustrative rather than restrictive, the scope of the invention being indicated by the appended claims.

What is claimed is:

1. In a vehicle turn signal system: pilot indicator means; a relay for controlling the operation of the indicator means; a series circuit including a source of direct current, switching means, the main relay winding and a load, in that order, the load consisting of a plurality of load devices in parallel; a compensating circuit connected directly across the switching means, said last-named circuit including a capacitor and an additional relay winding in series; said main and additional relay windings being wound so that they produce opposing fluxes in the relay whereby the additional winding is operable to compensate for variations in the source voltage; and an oscillator circuit for repetitively opening and closing the switching means so that current from the source is intermittently applied to the load devices; said capacitor being charged through the relay windings and load when the switching means is open and being discharged through the switching means and additional relay winding when the switching means is closed whereby current is applied to main and additional relay windings simultaneously; said relay being operable to energize the pilot indicator means when all of the load devices draw current and inoperable to energize the indicator means when one or more of the devices fails to draw current.

2. A vehicle turn signal system as defined in claim 1 wherein the switching means is the contact pair of a second relay forming a part of the oscillator circuit.

3. In a vehicle turn signal system: an indicator relay including a pair of normally open relay contacts; a series circuit comprising a source of direct current, a first normally closed switching means, the main relay winding, a second normally open switching means and a load, in that order, the load consisting of parallel branches of load devices, each branch having a plurality of parallel connected load devices therein, the second switching means having a plurality of different closed positions for connecting a selected one of the load device branches in the series circuit whereupon current from the source is immediately applied to the load devices in the branch; a compensating circuit connected across the first switching means, said last-named circuit including a resistor, a capacitor and an additional relay winding in series; said main and additional relay windings being wound so that they produce opposing fluxes in the relay whereby the additional winding is operable to compensate for variations in the source voltage; a transistor oscillator circuit connected to said first-named series circuit for repetitively opening and closing the first switching means so that current from the source is intermittently applied to a selected one of the load device branches when the second switching means is in its closed position for said branch, said oscillator circuit including an initially charged timing capacitor; and a pilot indicator connected in parallel with each load device branch so as to be actuated when current is applied to the branch; said relay being actuated to close its contacts when all of the load devices in the branch selected by the second switching means draw current and failing to actuate when one or more of the devices in the branch fails to draw current; the relay indicator contacts being in the discharge circuit of said timing capacitor so that the capacitor is prevented from discharging when the relay is not actuated whereby the load devices and pilot indicator for the selected branch remain in an on condition.

4. A vehicle turn signal system 3 as defined in claim 3 wherein the first switching means is the contact pair of an additional relay that forms a part of the oscillator circuit.

5. A vehicle turn signal system as defined in claim 3 together with a hazard warning circuit connected across the main relay winding and second switching means of a first-named series circuit, the hazard circuit comprising a third relay winding and a multipole hazard switch in series, said third relay winding being wound so that the flux it produces in the relay aids the flux produced by said additional relay winding.

* * * * *